May 4, 1943.                F. P. GARDNER                2,318,478
                              DIE INSERT
                         Filed June 17, 1941            2 Sheets-Sheet 1
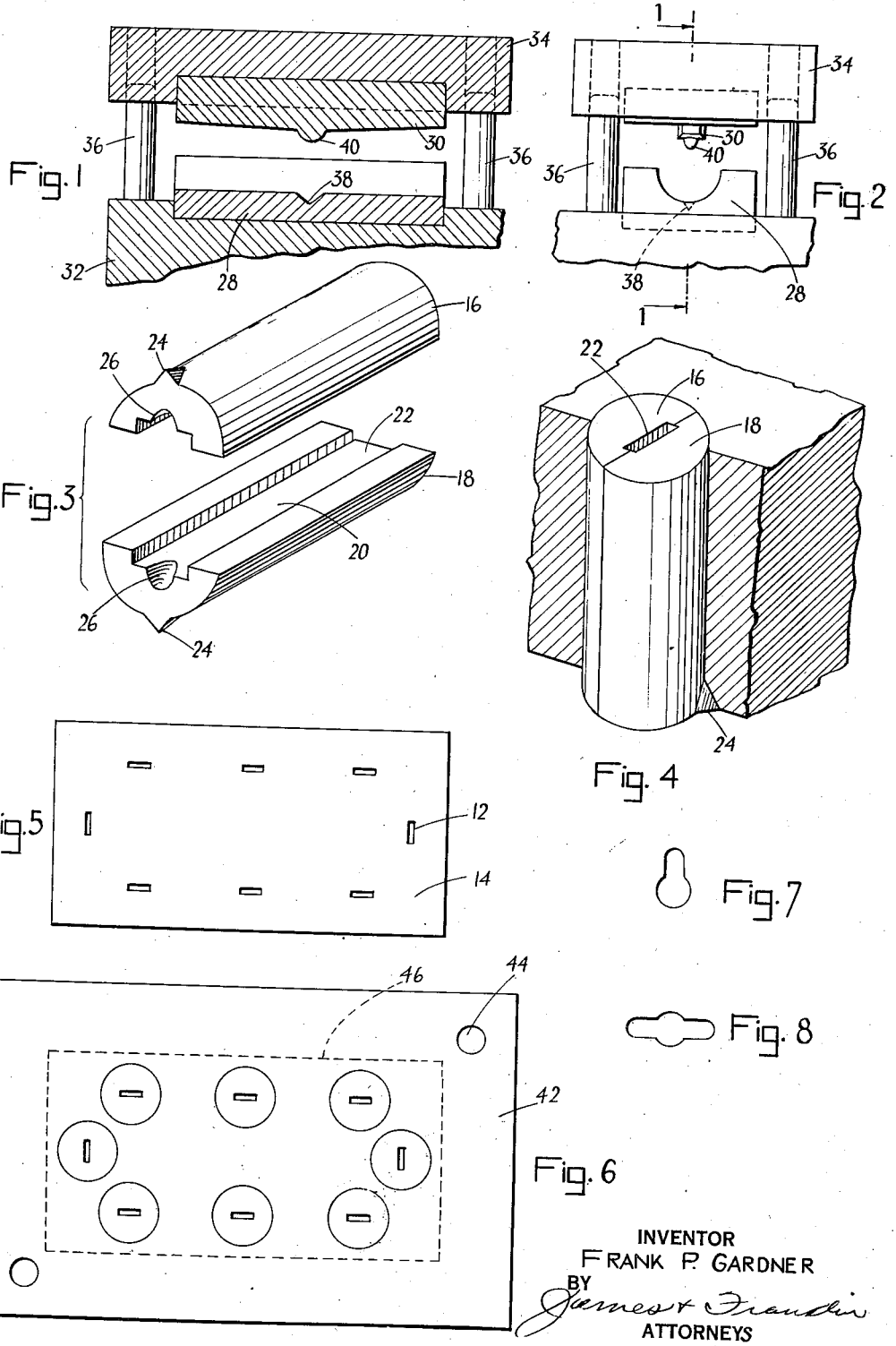
INVENTOR
FRANK P. GARDNER
BY
ATTORNEYS May 4, 1943.　　　F. P. GARDNER　　　2,318,478
DIE INSERT
Filed June 17, 1941　　　2 Sheets-Sheet 2
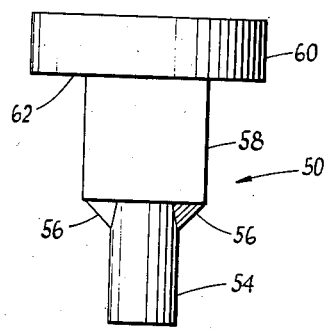
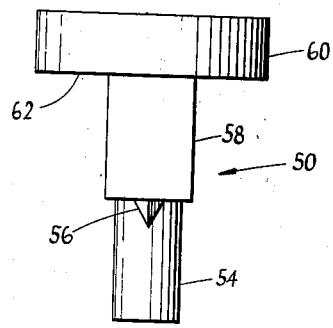
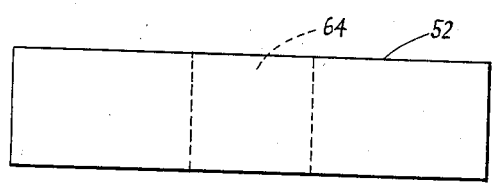
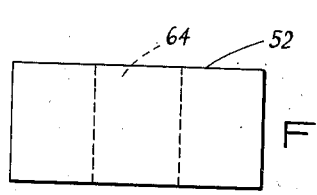
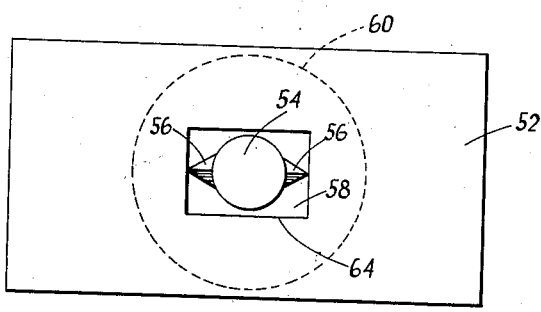
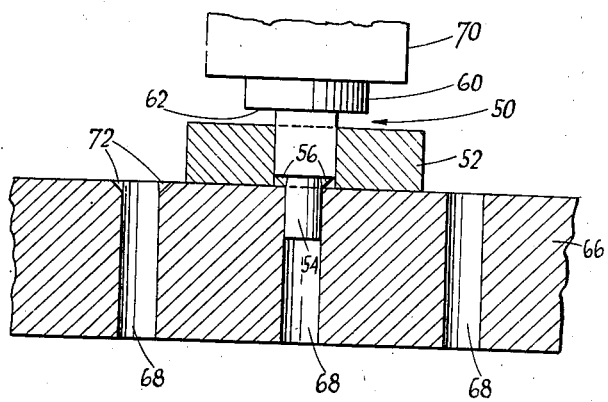
INVENTOR
FRANK P. GARDNER
BY
ATTORNEYS Patented May 4, 1943

2,318,478

UNITED STATES PATENT OFFICE 2,318,478

DIE INSERT

Frank P. Gardner, Erie, Pa., assignor to Louis Marx & Company, Inc., New York, N. Y., a corporation of New York Original application December 1, 1939, Serial No. 307,054. Divided and this application June 17, 1941, Serial No. 398,454

5 Claims. (Cl. 76—4)

This invention relates to dies, and more particularly to bushings or inserts for dies.

The primary object of the present invention is to generally improve and to facilitate and cheapen the manufacture of dies. In many cases a piece being made in the die must be provided with one or several slots of standard character. One example is a rectangular slot, such as is commonly used for tongue and slot connections between the parts of toys, electrical appliances, and other sheet metal products. Other examples are a keyhole slot and a "slip-over" or bayonet slot.

The main die block may be drilled to form a cylindrical hole which is later fitted with an insert, the insert having a die opening corresponding to the desired slot. The construction of the inserts by ordinary toolroom practice is troublesome. It is also difficult to properly orientate the insert in the die.

One object of the present invention is to make possible inexpensive and rapid production of the inserts. Another object is to provide the inserts with keys for properly orientating the same in the die. A further object is to provide a suitable tool for forming a keyway in the die, said keyway mating with the insert key and being properly located to suitably orientate the punch hole in the die. The latter object is the particular subject of the present application, the other subject matter being claimed in my parent application, Serial No. 307,054, filed December 1, 1939, of which the present application is a division.

To the accomplishment of the foregoing, and such other objects as may hereinafter appear, my invention consists in the tool and die elements and their relation one to the other, as hereinafter are more particularly described in the specification and sought to be defined in the claims. The specification is accompanied by drawings, in which:

Fig. 1 is a section through apparatus for forming the die insert;

Fig. 2 is an end elevation thereof;

Fig. 3 is a perspective view of the die insert with the halves spaced apart;

Fig. 4 is a partially sectioned perspective view showing the manner in which the die insert is received in a die;

Fig. 5 represents a piece of stock having slots punched therethrough;

Fig. 6 is a plan view of a simple form of die to make the piece shown in Fig. 5;

Fig. 7 illustrates a standard form of slot frequently required in a variety of work;

Fig. 8 illustrates still another such slot;

Fig. 9 is a front elevation of the reciprocable portion of a tool for forming the keyway in the die;

Fig. 10 is a side elevation of the same;

Fig. 11 is a front elevation of a stationary locating plate forming a part of the aforesaid tool;

Fig. 12 is an end elevation of the same;

Fig. 13 is a bottom view of the complete tool; and

Fig. 14 shows the tool in use.

Referring to the drawings, and more particularly to Fig. 5, there is frequent occasion to form a simple rectangular slot, such as the slot 12, in a piece of stock or sheet metal 14. These slots are commonly used for tongue and slot connections, as on toys, electrical appliances and other sheet metal products. In Fig. 5 the piece 14 is provided with eight such slots. The slots themselves are relatively standardized in character, and it is only the location of the same that must be suitably varied by the toolmaker when constructing a die. There are other slots which are relatively standardized in character and which are frequently encountered by toolmakers. Thus, there is the "slip-over" or bayonet slot shown in Fig. 7, and the keyhole slot shown in Fig. 8. The rectangular slot 12 will be discussed as a typical example of a standard slot, the need for which is frequently encountered.

In accordance with my invention, standardized bushings or inserts are made, such as that illustrated in Fig. 3. These are made under quantity production conditions and may be sold as a finished article to smaller shops for use as the need arises. The bushing or insert is made up of two segments or semi-cylindrical halves 16 and 18 which may be put together in face to face relation to form a complete cylindrical bushing or insert, as is shown in Fig. 4. Each half of the insert is provided with a groove or channel 20. At the upper end of the insert these channels make up a die opening 22 dimensioned to just receive a mating punch and to thereby form one of the desired slots 12. From the opening 22 the channels 20 diverge downwardly, thereby forming an enlarged passage for readily discharging the scrap cut away by the punch. At their lower ends the halves of the insert are provided with outwardly projecting integrally formed keys 24. These are preferably formed by indenting the metal at 26, thereby providing the necessary metal for the keys 24.

The keys may differ in shape. The illustrated key is an angle key, but a radius key may be provided or even a square key. The angle key is preferred merely because it is the simplest to form, and its mating keyway is also easy to form.

The preferred method for making the insert is illustrated in Figs. 1 and 2 of the drawings. I provide a die 28 and a hob 30. Die 28 may be mounted in a suitable holder 32, and hob 30 may be mounted in a suitable holder 34. Holder 32 is provided with guide pins 36 slidably received in mating holes in the holder 34. The die 28 is provided with a semi-cylindrical trough adapted to receive a piece of half-round stock having a length twice the desired length of the insert. It is additionally provided with a recess 38 for forming the keys 24. The hob 30 is dimensioned to form the grooves or channels 20. The hob is small at its ends and enlarged at the center, thereby providing the desired divergence or enlargement of channels 20. The hob is further provided with a projection 40 which displaces metal at the points 26 (Fig. 3) in order to force metal into the recess 38 and thereby form the keys 24.

It will be understood that a piece of half-round stock in unhardened condition is placed in die 28 and operated upon by hob 30, the entire hobbing tool being mounted in a suitable hydraulic press of sufficient capacity to perform the desired operation without difficulty. The formed piece is then removed from the die. If necessary, as when the amount of metal displaced by the hob is large, the face of the piece is machined to remove any excess metal. The piece is then cut transversely across the center to form the two halves shown in Fig. 3. When these are placed together, in face to face relation, they constitute a single cylindrical insert or bushing.

For a toolmaker having a supply of the standard bushings on hand, it is a very simple matter to make a die for stamping the piece shown in Fig. 5. Thus, referring to Fig. 6 the toolmaker first prepares a die block 42 and drills holes through the same of suitable size to receive the inserts. Each hole is, of course, centered at the desired location of the slot. Additional holes for guide pins may, of course, be provided, as is indicated at 44. The location of the piece of stock relative to the inserts is schematically indicated by the broken line 46.

The only remaining problem is to form the keyways to receive the keys 24, which keys properly orientate the inserts, for this in turn determines the orientation of the slots.

In accordance with a further feature of the present invention, I provide special mechanism for readily forming and properly orientating the keyways. Referring to Figs. 9 through 14 the complete tool preferably comprises a punch-like reciprocable portion generally designated 50, and a stationary locating plate 52 through which the tool 50 is slidable.

Tool 50 comprises a cylindrical pilot 54 having a diameter very slightly smaller than the diameter of the insert. The part 54 is intended to be slidably received in the hole in the die, which later receives the insert with a force fit. The tool 50 further comprises key portions 56 which are shaped like the keys 24 (Fig. 3) of the insert. Tool 50 further comprises a locator portion 58 which is of non-circular section and, specifically in the present case, rectangular in cross-section. Above the locator portion 58 there is an enlargement 60, the bottom 62 of which acts as a stop surface to limit the downward movement of the tool.

The plate 52 is a rectangular plate having a rectangular hole 64 therethrough, said hole being dimensioned to accurately slidably receive the locating portion 58 of tool 50. The bottom view of Fig. 13 shows the pilot portion 54, the key portions 56 and the locating portion 58 which corresponds to the hole 64.

Referring now to Fig. 14 after a die block 66 has been provided with the holes 68 for receiving inserts, the block is turned upside down and plate 52 is placed thereover and preferably clamped in proper position to suitably fix the direction of the key-forming portions 56 on the tool 50. The pilot portion 54 moves into the hole 68 as the tool 50 is forced downwardly, it being understood that the enlarged top 60 of the tool is secured to the vertically reciprocable ram 70 of any suitable mechanical or hydraulic press. In Fig. 14 the tool 50 has descended to a point where it is about to begin forming the keyways. The tool is forced downwardly by the press until the stop surface 62 reaches and bears against the locating plate 52. At this time the keyways are of correct depth and the thickness of plate 52 is selected with that purpose in mind.

The left-hand hole 68 in Fig. 14 has already been treated by tool 50, and the keyways 72 have already been formed therein. The center hole 68 is being treated, and the right-hand hole has yet to be worked upon. It will be understood that the plate 52 is moved from hole to hole, and that the die block 66 is moved to bring each hole under the tool 50. The plate 52 serves two purposes; first, for properly orientating the keyways in order to insure proper position of the slot when one of the previously prepared inserts or bushings is placed in the die; and second, to limit the downward movement of the tool 50 in order to accurately determine the depth and dimension of the keyways, so that the keys will be received therein with an exact fit.

It is believed that the method of making and using my improved die inserts, and of preparing a die to receive the same, as well as the many advantages thereof, will be apparent from the foregoing detailed description. Standardized inserts may be made up for the more popular or common kinds of slot. A number of different sizes of slot may be made in a single size of insert, and several different sizes of insert may be made to accommodate a still larger range of slot size. In every case the keys are formed integrally on the insert and are related in a standardized way to the direction of the slot or punch hole in the insert. By maufacturing the inserts as a stock proposition, they may be made up rapidly and cheaply, particularly if made by hobbing, as here disclosed. The toolmaker in making up a die has only to drill a hole of suitable size for the insert, and to then form the keyways. The latter operation can be accomplished quickly and inexpensively by using a special tool for the purpose. The appropriate insert is thereupon forced into the die block, thus completing the die.

It will be apparent that while I have shown and described my invention in a preferred form, many changes and modifications may be made without departing from the spirit of the invention, as sought to be defined in the following claims.

I claim:

1. A tool for forming keyways in a die having a hole for receiving a die insert having keys to properly orientate the insert, said tool comprising a pilot portion dimensioned to be received in the hole, key-forming portions to form the desired keyways, a non-circular locating portion thereabove, and a plate having a non-circular opening dimensioned to slidably but non-rotatably receive the non-circular locating portion, the disposition of said plate on a die serving to determine the orientation of the keyways.

2. A tool for forming keyways in a die having a hole for receiving a die insert having keys to properly orientate the insert, said tool comprising a pilot portion dimensioned to be received in the hole, key-forming portions to form the desired keyways, a non-circular locating portion thereabove, a stop surface above said locating portion, a plate having a non-circular opening dimensioned to slidably but non-rotatably receive the non-circular locating portion, said plate having a thickness such as to limit the stroke of the tool to the desired amount, the disposition of said plate on a die serving to determine the orientation of the keyways.

3. A tool for forming keyways in a die having a hole for receiving a die insert having keys to properly orientate the insert, said tool comprising key-forming portions to form the desired keyways, a non-circular locating portion thereabove, a plate having a non-circular opening dimensioned to slidably but non-rotatably receive the non-circular locating portion, the disposition of said plate on a die serving to determine the orientation of the keyways.

4. A tool for forming keyways in a die having a hole for receiving a die insert having keys to properly orientate the insert, said tool comprising key-forming portions to form the desired keyways, a non-circular locating portion thereabove, a stop surface above said locating portion, a plate having a non-circular opening dimensioned to slidably but non-rotatably receive the non-circular locating portion, said plate having a thickness such as to limit the stroke of the tool to the desired amount, the disposition of said plate on a die serving to determine the orientation of the keyways.

5. A tool and stop plate for forming keyways in a die having a hole for receiving a die insert having keys to properly orientate the insert, said tool comprising a pilot portion dimensioned to be received in the hole, key-forming portions to form the desired keyways, and a stop surface above said locating portion, said stop plate cooperating with said stop surface and having a thickness such as to limit the effective stroke of the tool to the desired amount in order to determine the depth of the keyways.

FRANK P. GARDNER.